(12) United States Patent
Zilavy

(10) Patent No.: US 8,880,582 B2
(45) Date of Patent: Nov. 4, 2014

(54) USER ACCESS TO A PARTITIONABLE SERVER

(75) Inventor: Daniel Zilavy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2114 days.

(21) Appl. No.: 11/731,277

(22) Filed: Mar. 30, 2007

(65) Prior Publication Data

US 2008/0244216 A1 Oct. 2, 2008

(51) Int. Cl.
*G06F 15/16* (2006.01)
*G06F 3/038* (2013.01)
*G06F 9/50* (2006.01)

(52) U.S. Cl.
CPC .............. *G06F 3/038* (2013.01); *G06F 9/5077* (2013.01)
USPC ........... 709/203; 709/204; 709/206; 718/104; 711/173

(58) Field of Classification Search
USPC ....................... 709/203; 711/173, 79; 718/104
See application file for complete search history.

(56) References Cited

U.S. PATENT DOCUMENTS

| | | | |
|---|---|---|---|
| 2003/0037178 A1* | 2/2003 | Vessey et al. | 709/319 |
| 2003/0110205 A1* | 6/2003 | Johnson | 709/104 |
| 2005/0071446 A1* | 3/2005 | Graham et al. | 709/223 |
| 2005/0120160 A1* | 6/2005 | Plouffe et al. | 711/1 |
| 2005/0240932 A1* | 10/2005 | Billau et al. | 718/104 |
| 2006/0112219 A1* | 5/2006 | Chawla et al. | 711/114 |
| 2006/0223456 A1* | 10/2006 | Ouzillou | 455/78 |
| 2007/0180448 A1* | 8/2007 | Low et al. | 718/1 |
| 2008/0104348 A1* | 5/2008 | Kabzinski et al. | 711/164 |

OTHER PUBLICATIONS

Jodh, Santosh et al., "Dynamic Partitioning in Windows Longhorn", Microsoft Corporation, 2005.
Milner, M. et al., "TAPoR Paper", Oct. 2003.

* cited by examiner

*Primary Examiner* — Khaled Kassim

(57) ABSTRACT

A partitionable server that enables user access thereto is provided. The partitionable server includes a plurality of partitions, each running an independent instance of an operating system (OS) and a first management module located in the partitionable server and interfacing with the plurality of partitions, the first management module is separate from the plurality of partitions and includes a physical user interface for local access to the partitionable server. The first management module is operable to provide mapping of a physical user interface device, which locally accesses the partitionable server through the physical user interface, to a virtual user interface of any one of the plurality partitions as desired for accessing the one partition.

17 Claims, 5 Drawing Sheets

USER ACCESS TO A PARTITIONABLE SERVER

BACKGROUND

Users of partitionable information technology (IT) servers (hereinafter, "partitionable server") often desire to access the various partitions therein for operational configuration and management. One apparent approach to accessing each and every server partition is to employ multiple sets of physical user interface devices (hereinafter, "physical UI devices"), such as a keyboard, a video monitor, and a mouse, with each set connected to input/output (I/O) interfaces of each available server partition. However, this partition-access approach is costly because it requires the use of multiple sets of physical UI devices and dedicated physical space near the partitionable server for placement of the physical UI devices. For example, when partitionable servers are rack mounted in an IT environment, multiple sets of physical UI devices required for each server would take up dedicate rack space that is typically at a premium. To avoid the aforementioned costly partition-access approach, a user may access each partition in a partitionable server by physically moving a single set of physical UI devices from partition to partition for connection thereto. While this alternate approach reduces the cost of having to employ multiple sets of physical UI devices, it is inconvenient to the user because it requires the user to expend time and energy to connect and disconnect physical UI devices from partition to partition as needed.

A more user friendly partition-access approach involves the installation of a conventional KVM switch ("KVM" stands for keyboard, video, and mouse) that connects to the multiple available partitions in the partitionable server. The user is then able to access each of the available partitions by connecting a single set of physical UI devices to the KVM switch, which provides switching from partition to partition. Thus, the user no longer needs to connect and disconnect the physical UI devices from partition to partition. However, this approach also requires dedicated physical space near the partitionable server for the placement and connection of the KVM switch to the multiple partitions in the partitionable server. To avoid the physical space requirement of the typical hardware KVM switch, widely-available software or virtual KVM switches may be employed to provide users with remote access to server partitions via a data network, such as the Internet or any other local area network (LAN) or wide area network (WAN). However, virtual KVM switches typically do not provide users with local access to the partitionable servers. This is important when, for example, the user desires to be at the physical location of the partitionable server to observe the configuration and management of such a server.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
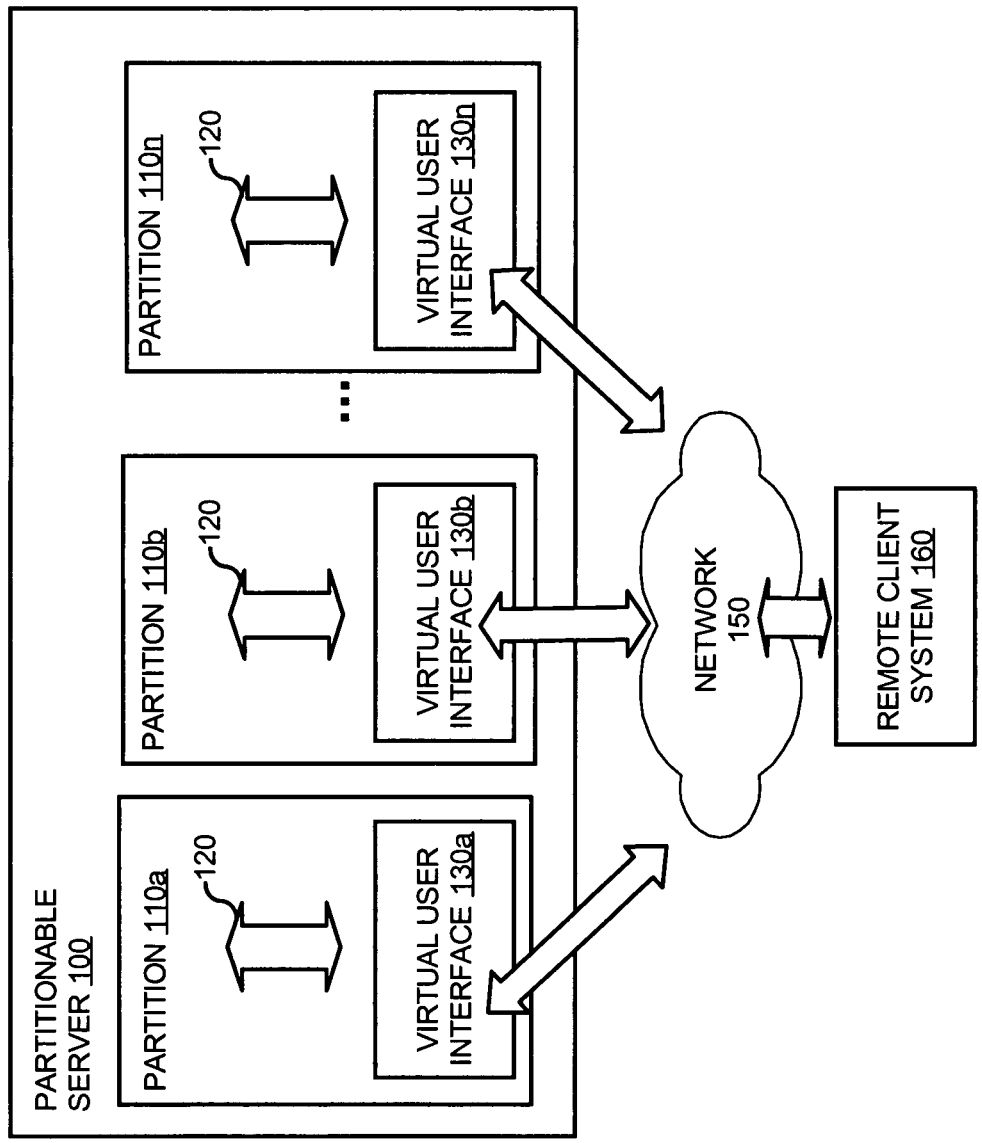
FIG. 1 illustrates a typical partitionable server that provides remote access to the partitions therein via software, or virtual, alternatives to a hardware KVM switch.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As referred herein, a physical user interface device, or physical UI device, is a hardware console or physical device that allows a user to interact with a server, such as inputting data to the server and observing data output from the server. Examples of a physical user interface device includes an electronic keyboard (hereinafter, "keyboard") or any other data input device, a video display or monitor, and an electronic mouse (hereinafter, "mouse") or any other pointing device.

As also referred herein, a server is a computer system having hardware and software integrated in a housing unit or chassis. Each server includes one or more server components, such as processors, memory devices, I/O host controllers, power supplies, and cooling fans. A processor is any of a number of single-core or multi-core computer processors, such as processors from Intel and AMD. Each computer processor may be a general-purpose processor, such as a central processing unit (CPU) or any other multi-purpose processor, such as a graphic processing unit (GPU), an audio processor, a digital signal processor, or another processor dedicated for one or more processing purposes. A memory device is a data storage unit, such as a computer readable medium (CRM), operable to store computer-executable program instructions for execution by the one or more processors in the server. The computer-executable program instructions include code from any suitable computer-programming language, such as C, C++, C#, Java, or the like.

Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions. An I/O host controller is operable to manage one or more I/O interfaces on the server to facilitate server communication with external devices. Examples of an I/O host controller include an Ethernet controller for managing a land area network (LAN) port for data communication, a video graphic array (VGA) controller for managing a video port for video input/output, and a USB host controller for managing one or more universal serial bus (USB) ports for a keyboard connection, a mouse connection, and any other USB devices.

Accordingly, as referred herein, a partitionable server is either hardware or virtual partitionable. In a hardware partitionable server, partitions may be dynamically or statically created. Each hardware partition runs an independent instance of an operating system (OS) with one or more assigned server components, such as processors, memory devices, and I/O host controllers. Thus, a dynamic hardware partitionable server has the ability to dynamically create and modify the number of independent or isolated hardware partitions in the server through a reassignment of the server components in the server to different hardware partitions. In contrast, a static hardware partitionable server includes one or more isolated hardware partitions, each with assigned server components that cannot be subsequently assigned to another hardware partition. An example of a static hardware partitionable server is a blade server system having multiple blade servers therein, each representing an isolated hardware partition. In a virtual partitionable server, partitions may be virtually created by a virtual machine (VM) host, which is also known as a hypervisor or a VM monitor. The VM host is an abstract or virtualized computing layer or environment that is software implemented on top of the server hardware. It is capable of hosting multiple virtual partitions called VM guests, each running an independent OS instance with one or more assigned server components. Unlike hardware partitions, virtual partitions are virtual machines. Thus, they are not electrically isolated from each other because their underlying server components are not electrically isolated from each other.

As further referred herein, "local" access or connection to a partitionable server refers to an access or connection to the partitionable server that is to the server itself rather than routing through an intervening data network. In contrast, "remote" (or "network") access or connection to the partitionable server refers to an access or connection to the partitionable server that is routed through an intervening data network. It should be noted that local access or connection to a server may be achieved through a "network" port of the server. Thus, the term "network" port references to a network protocol, such as Ethernet, that is employed for communication at the port and not to the network routing of the access.

Described herein are methods and systems that leverage existing technology, such as remote or virtual KVM switching, for remote connection to a partitionable server to provide users with local access to the partitionable server without the need for multiple sets of user interface devices or physical switching devices (e.g., KVM switches) that take up dedicated physical space. Consequently, dedicated premium physical space is no longer required for accessing the partitionable server. Furthermore, described herein are various embodiments for enabling a single set of user interface devices, such as a keyboard, a video monitor, and a mouse, to be mapped to each and every available partition in a partitionable server as desired or needed to provide local console support without the need to physically move such user interface devices from partition to partition. The local console support may be provided in addition to the remote access or remote console support.

FIG. 1 illustrates a typical partitionable server 100 that provides remote access to the partitions therein via software, or virtual, alternatives to a hardware KVM switch. The partitionable server 100 includes a plurality of partitions 110*a-n*, each running an independent OS instance with its own assigned server components in the partitionable server 100. The number of partitions may be set as desired by the user. As noted earlier, the partitions 110*a-n* are formed by either hardware (dynamic or static) or software partitioning of the available server components in the server 100. User access to each of the partitions 110*a-n* is provided by a corresponding one of the virtual user interfaces 130*a-n* implemented in each partition. Each of the virtual user interfaces 130*a-n* includes one or more virtual user interface devices (hereinafter, "virtual UI devices") that emulate physical UI devices of the same type. For example, each virtual user interface includes a virtual keyboard emulating a physical keyboard, a virtual video monitor emulating a physical video monitor, and a virtual mouse emulating a physical mouse. Thus, as referred herein, a virtual UI device is both hardware and software implemented, as further described below, to provide a physical register set for connection to a partition but emulates the remainder of a physical UI device.

For dynamic hardware partitioning of the server 100, the virtual user interfaces 130*a-n* are implemented by a number of plug-in hardware cards that are inserted into the server 100 to help form the same number of hardware partitions 110*a-n*. Each of the plug-in hardware cards is connected through a communication bus 120 to those server components in the server 100 that are assigned to a hardware partition as implemented by the plug-in hardware card. Examples of a communication bus 120 include an industry standard architecture (ISA) bus, a peripheral component interconnect (PCI) bus, and a PCI-Express (PCI-E) bus. Thus, the server 100 may be dynamically hardware partitioned through the removal and insertion of the plug-in hardware cards.

Figure 2:
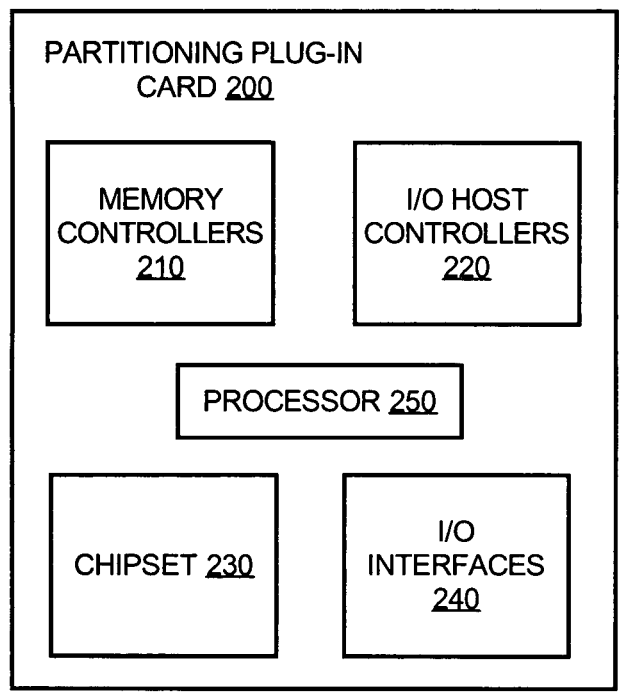
FIG. 2 illustrates a typical hardware plug-in card that is operable to implement dynamic hardware partitions and corresponding virtual user interfaces in the partitionable server illustrated in FIG. 1.

FIG. 2 illustrates a typical hardware plug-in card 200 that is operable to implement the dynamic hardware partitions 100*a-n* and corresponding virtual user interfaces 130*a-n* in the partitionable server 100. The plug-in card 200 includes one or more memory controllers 210, one or more I/O host controllers 220, one or more chipsets 230, a processor 240, and I/O interfaces 250. The components may be connected to one another via one or more communication buses on the plug-in card 200 (not shown) in a manner known in the art. Each memory controller 210 is operable to access and manage, via the communication bus 120 (FIG. 1), those memory devices in the partitionable server 100 that are assigned to a particular hardware partition implemented by the plug-in card 200. Examples of a memory controller 210 include an integrated drive electronics (IDE) controller, a small computer system interface (SCSI) controller, an advanced technology attachment (ATA) controller, a serial ATA (SATA) controller, and a graphic controller that controls its video frame buffer.

As described earlier, each I/O host controller 220 is operable to manage one or more I/O interfaces 250 to facilitate communication between a hardware partition in the server 100 and external devices such as user interface devices. The managed I/O interfaces 250 provide connection to one or more user interface devices. In this case, at least some of the I/O interfaces 250 are virtual user interfaces 130*a-n* to virtual UI devices that emulate physical UI devices as described earlier. Thus, some of the I/O interfaces 250 may be hardware and software implemented to provide a physical register set for connection to a server partition but emulates the remainder of those physical UI devices that they virtualize.

The processor 240 may be any of a number of computer processors as described earlier. It interacts with the chipset 230 to manage the memory controllers 210 and I/O host controllers 220 to effect a respective hardware partition (110*a-n*) of the server 100 and a corresponding virtual user interface (130*a-n*). Thus, the chipset 230 is operable to assist the processor 240 in the management of the memory controllers 210 and I/O host controllers 220 to support the implementation of hardware partitioning through assignment of one or more server components in the server 100 to each hardware partition. It should be noted that some of the components that are normally located on the server 100, such as I/O host controllers and I/O interfaces, may be allocated on the plug-in cards instead to facilitate the hardware partitioning. It should be understood that the memory controllers 210 and the I/O host controllers 220 may be integrated in the chipset 230 as well.

For static hardware partitioning of the server 100, each of the virtual user interfaces 130*a-n* is implemented in a static hardware partition, with server components therein permanently assigned or allocated to the hardware partition. In other words, once the server components are assigned to each static hardware partition, they cannot be subsequently reassigned to another static hardware partition. For example, the server 100 may be a blade server system with multiple blade servers therein operating as static hardware partitions, with each blade server implementing a partition (110*a-n*) with a virtual user interface (130*a-n*) operating therein.

For virtual partitioning of the server 100, the virtual user interfaces 130*a-n* are implemented in VM guests that are hosted by a VM host or hypervisor. Each VM guest implements a virtual partition that employs the server components assigned thereto by the VM host in a manner understood in the art. Thus, each of the partitions 110*a-n* in FIG. 2 represents a VM guest. As with dynamic hardware partitions, the server components in the server 100 may be assigned and reassigned to different virtual partitions 110*a-n* as desired.

Accordingly, each hardware or virtual partition (110*a-n*) in the server 100 provides a virtual user interface (130*a-n*) to enable remote access to the partitions. That is, each virtual user interface virtualizes those user interface transactions output by its corresponding partition for transmission to the remote client 160 via the data network 150. The remote client 160 is operable to translate the virtualized user interface transactions into signals that are understood by its physical UI devices. Conversely, any user interface transactions output by the physical UI devices of the remote client 160 are packetized by the remote client 160 for transmission through the data network 150 and subsequently virtualized by the virtual user interface for receipt by the partition. Thus, from the viewpoint of the OS running the partition, the physical UI devices of the remote client 160 function as if they are physical UI devices locally and directly connected to the partition. However, as noted earlier, this remote access technology does not provide users with local access to the partitionable servers. For example, a user may desire to be at the physical location of the partitionable server 100 while accessing each and every available partition therein in order to observe the configuration and management of such a server.

Figure 3:
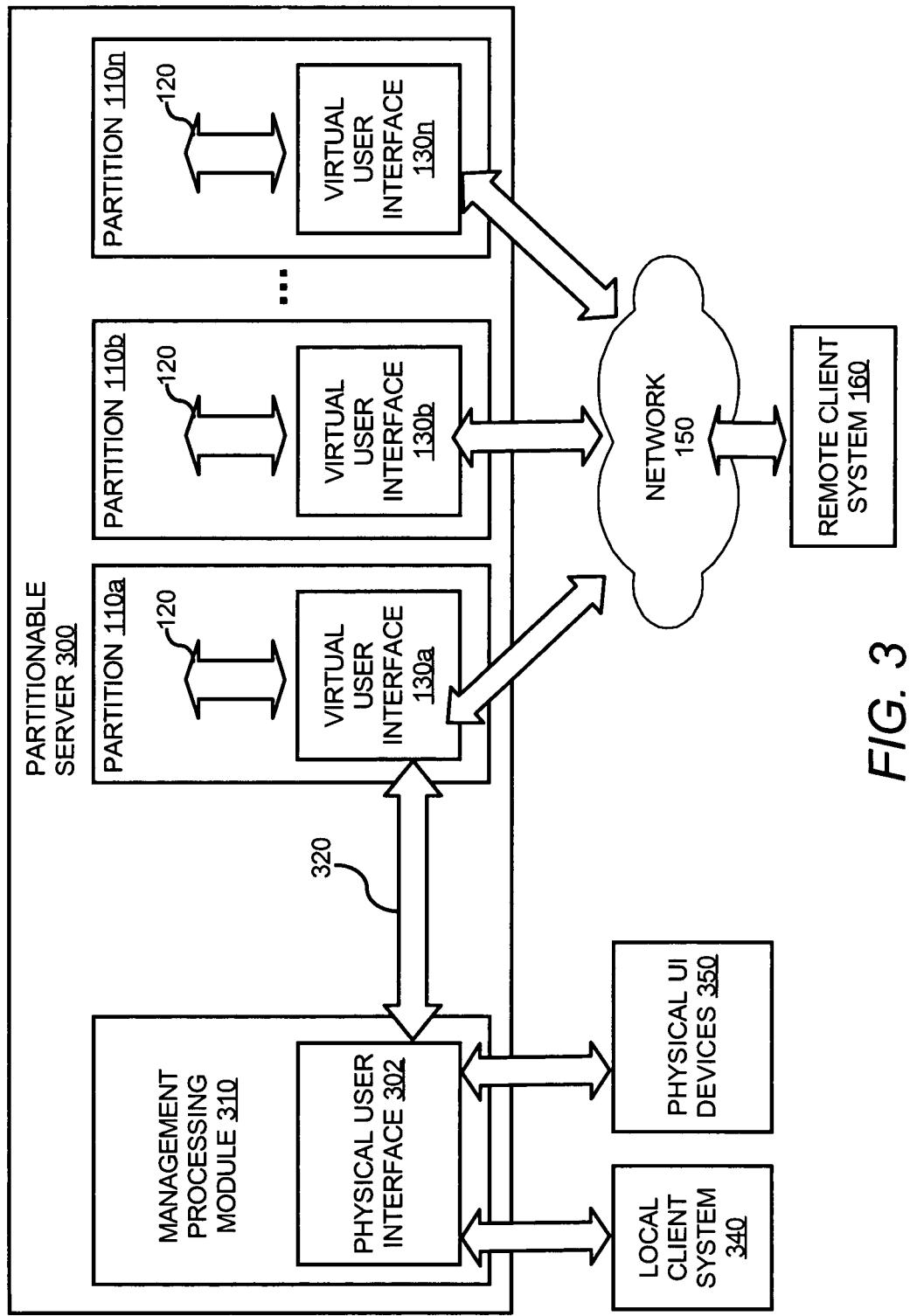
FIG. 3 illustrates a partitionable server that provides both remote access and convenient, low-cost local access to the partitions, in accordance with one embodiment.

FIG. 3 illustrates a partitionable server 300 that provides both remote access and convenient, low-cost local access to the partitions, in accordance with one embodiment. As with the conventional partitionable server 100 illustrated in FIG. 1, the partitionable server 300 includes a plurality of partitions 110*a-n*, each running an independent OS instance with its own assigned server components in the partitionable server 100 as described earlier. Again, the number of partitions may be set as desired by the user and formed by either hardware or software (virtual) partitioning as also described earlier. Thus, for dynamic hardware partitioning, plug-in cards 200 illustrated in FIG. 2 may be employed; for static hardware partitioning, server components may be permanently assigned or allocated to the hardware partition; and for virtual partitioning, software-implemented VM guests may be employed.

Further embedded or included in the partitionable server 300 is a management processing (MP) module 310 that communicates with the virtual user interfaces 130*a-n* in the partitions 110*a-n* via a management fabric 320. In one embodiment, the management fabric 320 is a network connection, such as an Ethernet connection or any other known network protocol, similar to the connection each of the partitions 110*a-n* (and corresponding virtual user interface set therein) has to the data network 150 for remote access by the remote client 160. Thus, for dynamic hardware partitioning that employs plug-in cards 200 (FIG. 2) as described earlier, the I/O interfaces 250 further include physical communication ports, such as Ethernet ports, for connection with the MP module 310 via the management fabric 320. For static hardware partitioning, each virtual user interface (130*a-n*) also includes physical I/O interfaces for connection with the MP module 310 via the management fabric 320. For virtual partitioning, the VM host is operable to manage one or more physical I/O interfaces in the server for connection with the MP module 310 via the management fabric 320. Likewise, the MP module 310 includes I/O interfaces 312 with one or more communication ports therein, such as Ethernet ports, for connection to the hardware or virtual server partitions via the management fabric 320.

In one embodiment, the MP module 310 is operable to maintain information about the partitions 110*a-n* such as the server components in the server 300 that are assigned to each partition and health statuses of such components (e.g., whether cooling fans or power supplies operating properly). The MP module 310 is also operable to provide management of the server components and assignment of such components to the partitions 110*a-n*. To that end, the MP module 310 provides users, such as system administrators, with a user interface, such as a software-implemented graphical user interface (GUI), for monitoring information about the server components, to maintain such components, and to assign such components to the partitions 110*a-n*. In turn, the users may access such a GUI through a physical user interface, such as a network port like a LAN or Ethernet port. For example, the GUI may be a web-based GUI that allows user access through the Internet or a private data network within a user's IT infrastructure.

In one embodiment, the MP module 310 is operable to map connected physical UI devices 350 to virtual UI devices as facilitated by the virtual interfaces 130*a-n* to provide users with access to each of the partitions 110*a-n* in the server 300. The physical UI devices 350, such as a keyboard, a video monitor, and a mouse, may be connected to the MP module 310 via a physical user interface 302. In another embodiment, the MP module 310 is further operable to map physical UI devices of a local client system 340 to virtual UI devices as facilitated by the virtual interfaces 130*a-n* to provide users with alternate access to each of the partitions 110*a-n* in the server 300. The local client system 340, such as a laptop or desktop PC having a keyboard, a video monitor, and a mouse, may be connected to the MP module 310 via the physical user interface 302 as well.

Figure 4:
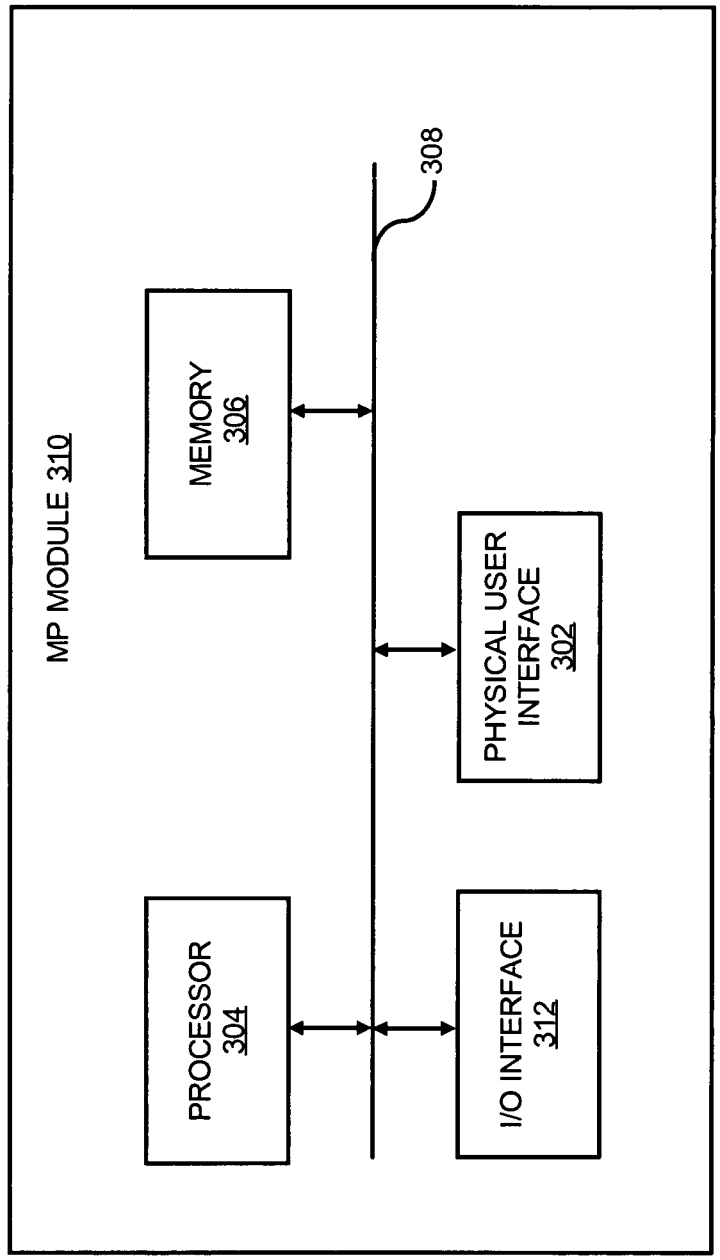
FIG. 4 illustrates a block diagram of A MP module that is embedded or incorporated in the partitionable server illustrated in FIG. 3, in accordance with one embodiment.

FIG. 4 illustrates a block diagram of the MP module 310 that is embedded or incorporated in the partitionable server 300, in accordance with one embodiment. The MP module 310 includes the I/O interface 312, the physical user interface 302 as noted above, a processor 304, a memory device 306, and a communication bus 308. The I/O interface 312 is as described earlier. The physical user interface 302 includes one or more I/O ports for connection of physical UI devices, for connection to a user's IT infrastructure for user's access to the aforementioned GUI, for connection to a data network from which a user can access the aforementioned GUI, or any combination thereof. Examples of an I/O port include a VGA port for a video monitor, a keyboard port for a keyboard, a USB port for a mouse, and one or more LAN ports or any other network ports for a local client PC and for network access to the aforementioned GUI. The processor 304 may be any of a number of computer processors as described earlier. It executes software programming instructions as stored in the memory device 306 to provide users with the aforementioned GUI for managing the server 300 and its components therein and to map physical UI devices to virtual UI devices as described earlier. The memory device 306 may be a CRM as described earlier. The physical user interface 302, the processor 304, and the memory device 306 may be connected to one another via the communication bus 308. Alternative embodiments are contemplated wherein the server 300 may have embedded or incorporated therein two or more MP modules, each arranged and functioned as the MP module 310 described above. However, only one MP module is active at any given time with the remaining MP module(s) serving as a redundant or backup MP module(s) in case the active MP module fails or otherwise becomes inoperable.

Figure 5:
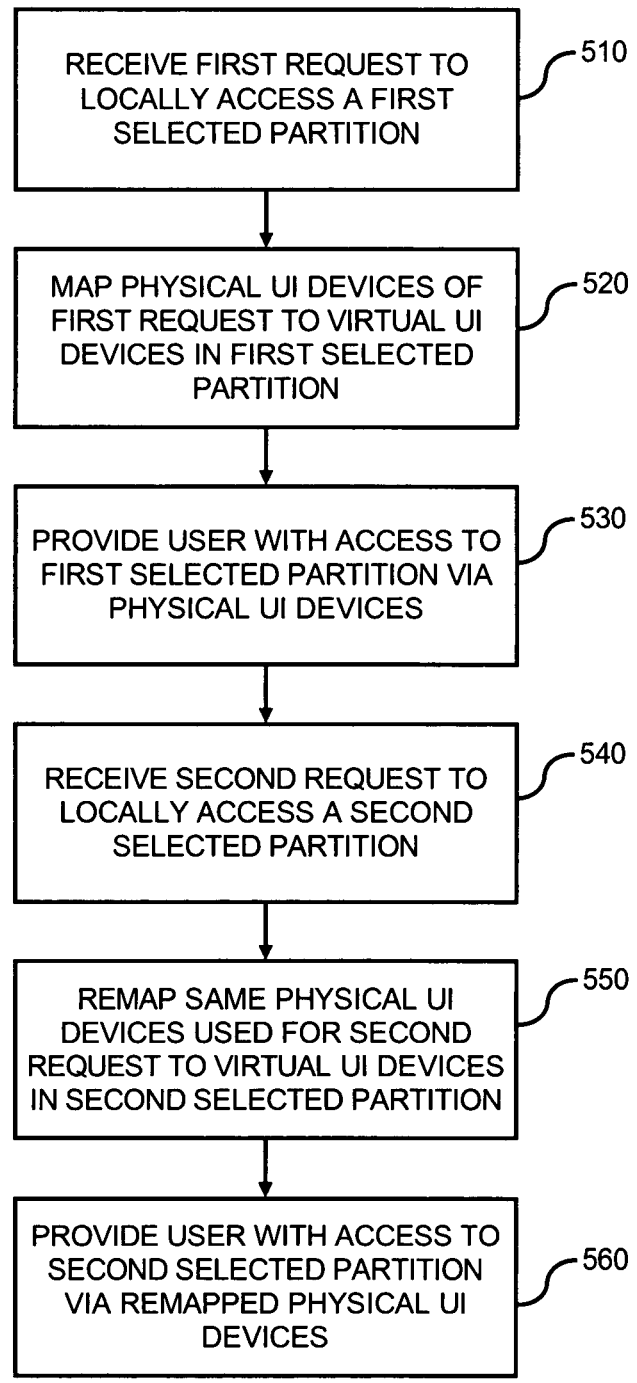
FIG. 5 illustrates a method for mapping physical UI devices to virtual UI devices to locally access each and every available partition in a partitionable server, in accordance with one embodiment.

FIG. 5 illustrates a method 500 for mapping physical UI devices to virtual UI devices to locally access each and every available partition in a partitionable server, in accordance with one embodiment. For illustrative purposes only and not to be limiting thereof, the method 500 is discussed in the context of the partitionable server 300 illustrated in FIG. 3.

At 510, a first request is received by the server 300 to locally access a first selected one of the partitions in the server 300. This first request may be entered by a user, such as a system or server administrator, through the aforementioned GUI provided by the MP module 310. The user may use local physical UI devices 350 that are connected to the MP module 310 or the physical UI devices on the client system 340 that is also locally connected to the MP module 310 to enter the first request into the GUI. Thus, the first request is received by the MP module 310.

At 520, based on the received first request, the MP module 310 proceeds to map the physical UI devices used by the user to the corresponding virtual UI devices for the first partition that the user wishes to access. This mapping is performed by the processor 304 executing software programming instructions for mapping, as stored in the memory device 306, to interact with the virtual user interface (130a-n) in the first partition. If the server 300 employs hardware partitioning, the processor 304 interacts with the processor 240 and the chipset 230 (for dynamic hardware partitioning or equivalent thereof in a static hardware partition) so as to map the physical UI devices to the virtual UI devices as provided by the virtual user interface (130a-n) in the first selected partition. If the server 300 employs virtual partitioning, the processor 304 interacts with the VM guest that represents the first partition so as to map the physical UI devices to the virtual UI devices provided in the virtual user interface of the VM guest.

At 530, once the physical UI devices are mapped to the corresponding virtual UI devices in the first selected partition, the MP module 310 provides the user with access to the first selected partition via the physical UI devices. Thus, from the viewpoint of the OS running the first selected partition, the physical UI devices function as if they are locally and directly connected to the first selected partition rather than through the MP module 310. For example, when the OS in the first partition writes data to the virtual video device in the virtual user interface (130a-n) of the first selected partition, that data is transferred to the MP module 310, which in turn maps such data to an actual video monitor that is connected to a physical video port that is a part of the physical user interface 302 of the MP module 310. Conversely, when input data from a physical keyboard or mouse connected to a keyboard or mouse port of the physical user interface 302 is read by the MP module 310, such data is mapped to the virtual keyboard or mouse in the virtual user interface (130a-n) of the first selected partition so that it can be received and understood by the first partition.

At 540, a second request from the same physical UI devices that generates the first request is received by the server 300 to locally access a second selected partition in the server 300. This second request is also received by the MP module 310.

At 550, based on the received request, the MP module 310 proceeds to remap the physical UI devices to the virtual UI devices for the second partition in a similar manner as described above at 530 with regard to the mapping to the virtual UI devices for the first partition.

At 560, once the physical UI devices are mapped to the corresponding virtual UI devices in the second selected partition, the MP module 310 provides the user with access to the second selected partition via the physical UI devices in a similar manner as described above at 540 with regard to the first selected partition.

Subsequent requests to locally access other selected partitions in the server 300 follow in similar manners as described above with regard to local accesses of the first and second selected partitions. Furthermore, the physical UI devices may be standalone physical UI devices 350 or those of a local client system 340.

Accordingly, the embodiments as described herein leverages existing remote technology for remote access to partitions in a partitionable server to provide users with additional local access to the partitions, wherein the local access allows users to operate physical UI devices, such as a keyboard, video monitor, and mouse, to access each of the server partitions as if such physical UI devices are physically attached to each of the partitions.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A partitionable server that enables user access thereto, comprising:

a plurality of partitions, each of the plurality of partitions running an independent instance of an operating system (OS) and having a virtual user interface and at least one physical input/output (I/O) interface connected to the virtual user interface; and a first management module located in the partitionable server and interfacing with the plurality of partitions, wherein the first management module is separate from the plurality of partitions and includes a physical user interface connected to the at least one physical I/O interface of each of the plurality of partitions to provide local access to the partitionable server;

wherein the first management module is operable to provide mapping of a physical user interface (UI) device, which locally accesses the partitionable server through the physical user interface of the first management module and through the at least one physical I/O interface of any one of the plurality partitions as desired for accessing the one partition,
wherein the physical user interface includes a local device port for local connection of the physical UI device, and at least one network port for a user to access a GUI enabling monitoring and maintaining at least one of the components in the partitionable server or for connection of a client system to access a partition in the partitionable server.

2. The partitionable server of claim 1, wherein the physical UI device is one of a computer keyboard, a video monitor, and a computer pointing device that is locally connected to the first management module.

3. The partitionable server of claim 2, wherein the virtual user interface includes a virtual UI device of a type that emulates the physical UI device that is locally connected to the physical user interface of the first management module.

4. The partitionable server of claim 1, wherein the physical UI device is one of a computer keyboard, a video monitor, and a computer pointing device of a client system, wherein the client system is locally connected to the physical user interface of the first management module.

5. The partitionable server of claim 1, further comprising:
another physical UI device remotely connected to the virtual user interface of the one partition via a data network rather than the first management module.

6. The partitionable server of claim 1, wherein the partitionable server is one of:
a hardware partitionable server with the plurality of partitions being partitioned by hardware, and
a virtual partitionable server with the plurality of partitions being partitioned by software.

7. The partitionable server of claim 1, wherein the partitionable server is one of:
a dynamic hardware partitionable server with the plurality of partitions being partitioned by plug-in hardware cards,
a blade server system with the plurality of partitions being blade servers, and
a virtual partitionable server with the plurality of partitions being virtual machines.

8. The partitionable server of claim 1, wherein the physical user interface includes at least one of a keyboard port, a video port, a mouse port, and network port.

9. The partitionable server of claim 1, further comprising:
a second management module arranged and functioned as the first management module, the second management module is a backup module for the first management module.

10. A method for providing user access to a plurality of partitions in a partitionable server which also includes a first management module separate from the plurality of partitions, the method comprising:
for each of the plurality of partitions, providing a virtual user interface (UI) device and at least one physical input/output (I/O) interface;
providing a physical user interface in the first management module, wherein the physical user interface is connected to the at least one physical I/O interface of each of the plurality of partitions;
receiving a first request to locally access a first selected one of the plurality of partitions from a first physical UI device, wherein the physical user interface includes a local device port for local connection of the physical UI device, and at least one network port for a user to access a GUI enabling monitoring and maintaining at least one of the components in the partitionable server or for connection of a client system to access a partition in the partitionable server;
the first management module mapping the first physical UI device to the virtual UI device in the first selected partition;
providing the mapped first physical UI device with access to the first selected partition through the at least one physical I/O interface of the first selected partition;
receiving a second request to locally access a second selected one of the plurality of partitions from a second physical UI device; and
the first management module mapping the second physical UI device to the virtual UI device in the second selected partition through the at least one physical I/O interface of the second selected partition; and
providing the mapped second physical UI device with access to the second selected partition.

11. The method of claim 10, wherein the step of receiving the first request comprises:
receiving the first request through the local device port to locally access the first selected partition with the first physical UI device that is locally connected to the physical user interface of the first management module.

12. The method of claim 11, wherein the first and second physical UI device are the same device.

13. The method of claim 11, wherein the step of receiving the second request comprises:
receiving the second request to locally access the second selected partition with a second physical UI device of a client system that is locally connected to the physical user interface of the first management module.

14. The method of claim 13, wherein the first and second selected partitions are the same partition.

15. The method of claim 10, further comprising:
receiving a third request to remotely access one of the plurality of partitions from a third physical UI device.

16. The method of claim 10, wherein the first physical UI device is one of a computer keyboard, a video monitor, and a computer pointing device that is locally connected to the physical user interface of the first management module.

17. A non-transitory computer readable storage medium encoded with computer executable instructions to provide user access to a plurality of partitions in a partitionable server which also includes a first management module separate from the plurality of partitions, each of the plurality of partitions includes a virtual user interface and at least one physical input/output (I/O) interface connected to the virtual user interface, and the first management module including a physical user interface connected to the at least one physical I/O interface of each of the plurality of partitions, the computer readable storage medium comprising:
computer executable instructions executed to receive a first request to locally access a first selected one of the plurality of partitions from a first physical user interface (UI) device, wherein the physical user interface includes a local device port for local connection of the physical UI device, and at least one network port for a user to access a GUI enabling monitoring and maintaining at least one of the components in the partitionable server or for connection of a client system to access a partition in the partitionable server;
computer executable instructions executed in the first management module to map the first request from the first physical UI device to the first selected partition through the physical user interface of the first management module and through the at least one physical I/O interface of the first selected partition;
computer executable instructions executed to provide the first physical UI device with access to the first selected partition;
computer executable instructions executed to receive a second request to locally access a second selected one of the plurality of partitions from a second physical UI device;
computer executable instructions executed in the first management module to map the second request from the second physical UI device to the second selected partition through the physical user interface of the first management module and through the at least one physical I/O interface of the second selected partition; and
computer executable instructions executed to provide the second physical UI device with access to the second selected partition.

\* \* \* \* \*